Figure 1:
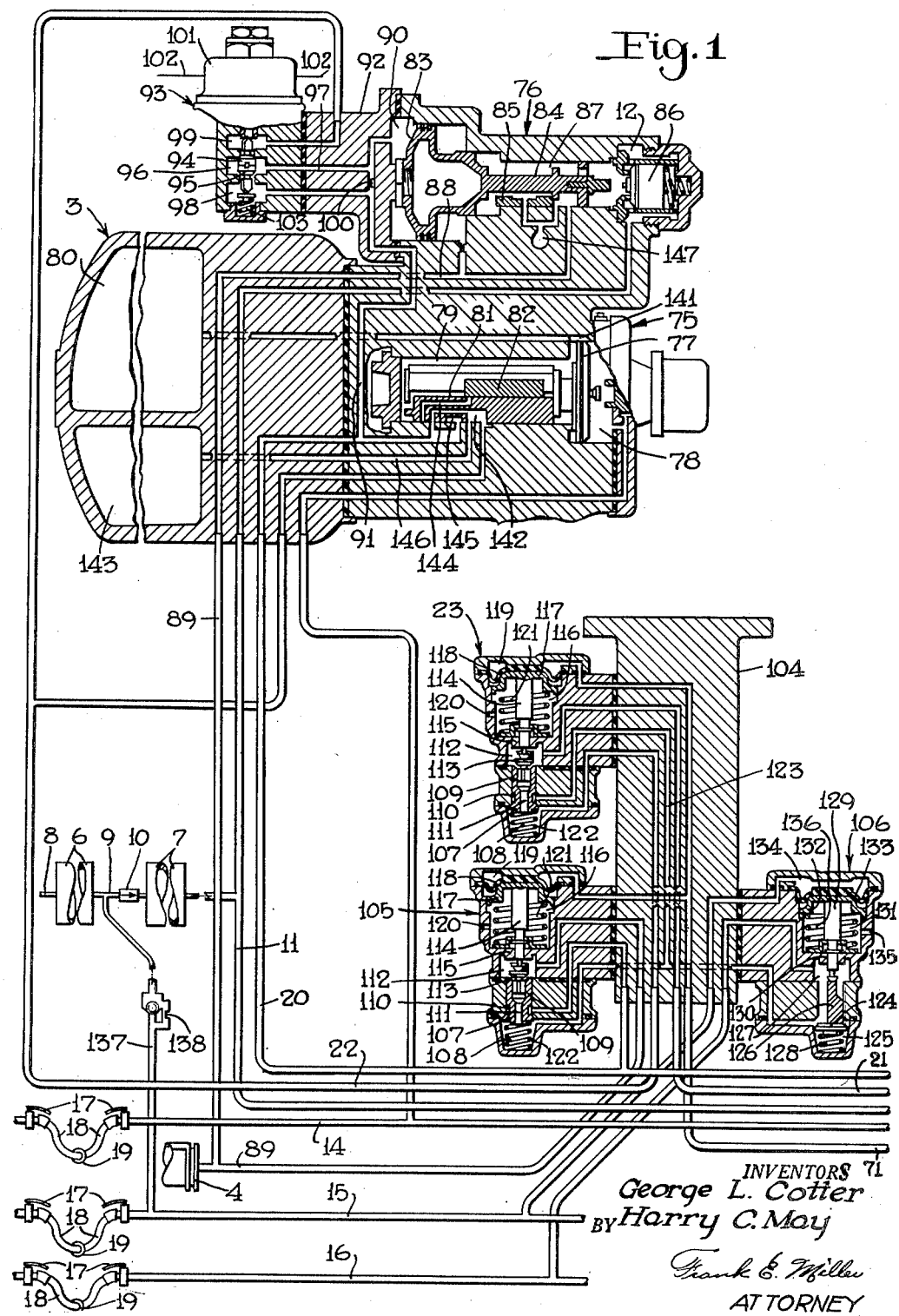

April 26, 1955

G. L. COTTER ET AL 2,707,133

FLUID PRESSURE BRAKE EQUIPMENT

Filed April 27, 1951

2 Sheets-Sheet 1

INVENTORS
George L. Cotter
By Harry C. May

Frank E. Miller
ATTORNEY

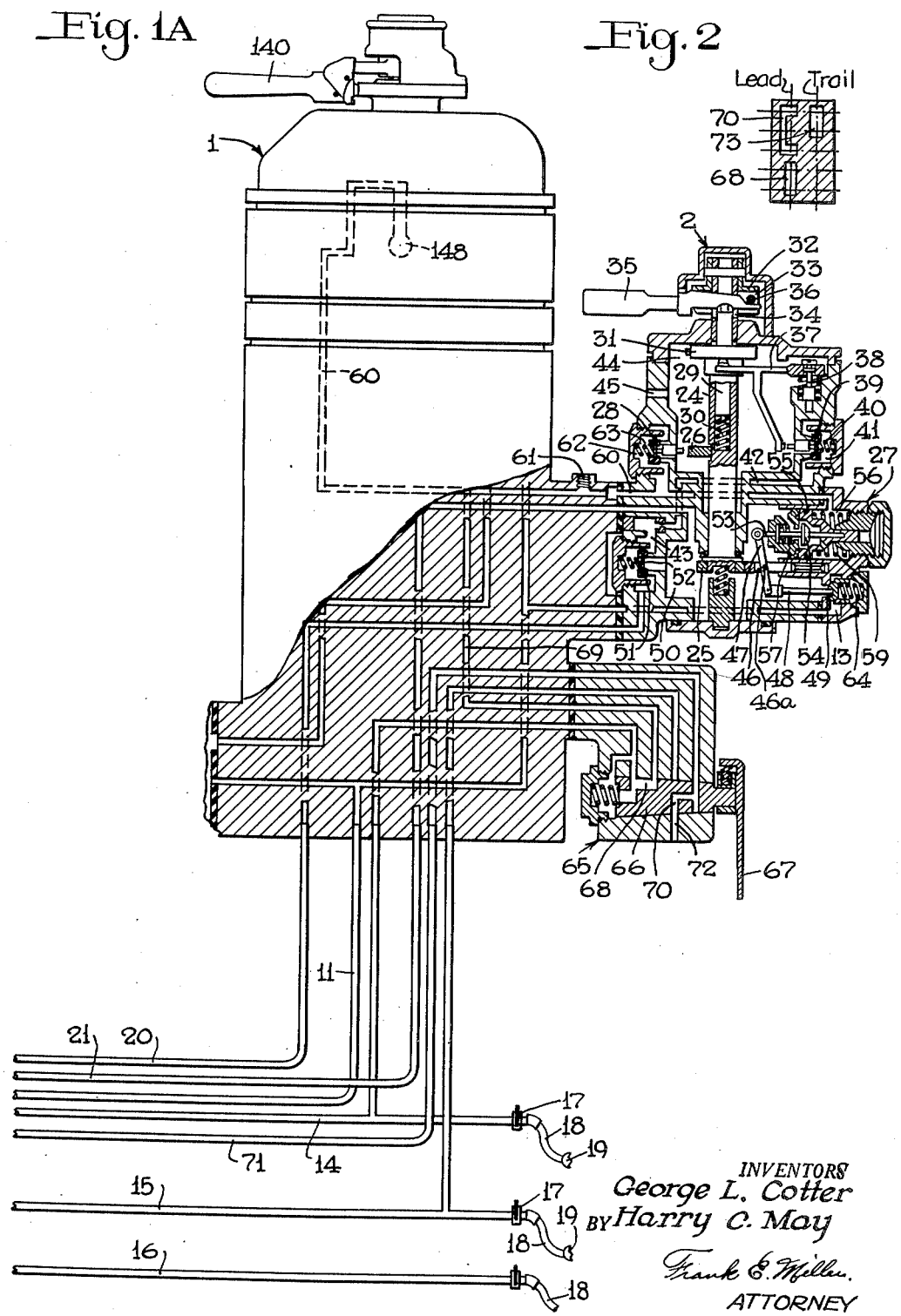

United States Patent Office 2,707,133
Patented Apr. 26, 1955

2,707,133

FLUID PRESSURE BRAKE EQUIPMENT

George L. Cotter, Pittsburgh, and Harry C. May, East McKeesport, Pa., assignors to Westinghouse Air Brake Company, a corporation of Pennsylvania Application April 27, 1951, Serial No. 223,301

7 Claims. (Cl. 303—3)

This invention relates to fluid pressure brake equipment and more particularly to the type for use on railway locomotives.

When several locomotives or units thereof are coupled together for controlling a train it is desirable that the engineer on the lead locomotive be able to control application and release of brakes on all units by operation of his usual independent brake valve device. It is also desirable that in case one or more of the locomotive units breaks away from the remainder of the train that the brakes on such units automatically be applied to ensure stopping thereof. Further, in case of double or multiple heading of diesel electric locomotives on which the usual traction motors are adapted to act as generators to provide dynamic braking, it is desirable that an automatic application of fluid pressure brakes on the locomotive be prevented, or if in effect be released, when the dynamic brakes are effective, but it is also desirable under such a condition that by operation of the independent brake valve device the engineer be able to apply and release the brakes on the locomotives whenever he so desires.

The principal object of the invention is the provision of an improved locomotive brake equipment embodying the above features.

Other objects and advantages will become apparent from the following more detailed description of the invention.

In the accompanying drawings, Figs. 1, 1A, when the right-hand edge of Fig. 1 is matched to the left-hand edge of Fig. 1A, is a diagrammatic view of a locomotive brake equipment embodying the invention; and Fig. 2 is a development diagram of a double heading cock constituting a portion of the equipment shown in Fig. 1A.

DESCRIPTION

For illustration, the invention is shown in the drawings associated with Westinghouse Air Brake Company's 6SL Locomotive Brake Equipment disclosed in their Instruction Pamphlet No. 5046–15 dated June 1950. This equipment is generally similar to the well-known ET locomotive equipment and comprises an engineer's automatic brake valve device 1, independent brake valve device 2, distributing valve device 3, brake cylinder device 4 and main reservoirs 6, 7. The main reservoir 6 is adapted to receive fluid under pressure via pipe 8 from an air compressor (not shown) and such fluid is adapted to flow through a pipe 9 containing a check valve 10 to the reservoir 7 from which fluid under pressure is adapted to flow through a pipe 11 to a supply valve chamber 12 in the distributing valve device 3, to the automatic brake valve device 1 and a supply valve chamber 13 in the independent brake valve device 2. Numerals 14, 15 and 16 designate, respectively, the usual brake pipe, a main reservoir pipe and an equalizing pipe, the brake pipe 14 being adapted to be connected to a corresponding brake pipe on other units of a locomotive and on cars of a train through the usual angle cocks 17, flexible hose 18 and couplings 19, while the pipes 15 and 16 are adapted to be similarly connected between locomotive units but not to cars of a train. At the leading end of the locomotive all angle cocks 17 will be closed while at the trailing end only the angle cock 17 in the brake pipe will be open. In case of double or multiple heading all of the angle cocks 17 between the different locomotive units will be open.

The numeral 20 designates the usual application pipe connecting the distributing valve device 3 to the independent brake valve device 2, while 21, 22 designates portions of the usual distributing valve release pipe for connecting said brake valve device to said distributing valve device, communication between pipes 21, 22 being controlled, according to the invention, by a dynamic brake interlock device 23.

The automatic brake valve device 1 may be of conventional structure comprising a handle 140 having the usual running and holding positions for charging the brake pipe 14 with fluid under pressure; the usual service and emergency positions for effecting service and emergency, respectively rates of reduction in pressure in said brake pipe, and a lap position employed after use of service position for limiting the degree of a service reduction in brake pipe pressure.

The independent brake valve device 2 is associated preferably with the automatic brake valve device 1 and comprises a casing containing a rotary shaft 24 for controlling through the medium of cams 25, 26 a self-lapping supply and release valve mechanism 27 and a cut-off valve 28, respectively. Slidably mounted in an axial bore in shaft 24 is a plunger 29 urged upwardly by a spring 30, a collar 31 being slidably mounted on shaft 24 and connected to plunger 29 for movement therewith. An element 32 secured to the upper end of shaft 24 has diametrically opposite arranged slots 33 aligned with a through slot 34 through shaft 24 through which slots extends an operating handle 35 fulcrumed at one end on a roller 36 carried by said element at one side of said shaft. Within shaft 24 the plunger 29 engages handle 35, whereby spring 30 will hold said handle in a normally elevated position when said handle is relieved of hand pressure. The handle 35 is rotatable in a horizontal plane from a running position, in which it is shown in the drawing, through an application and release zone, and in any position in such horizontal plane of movement is depressible vertically to move the plunger 29 and collar 31 downward. Such movement of collar 31 is adapted to actuate a lever 37 about a fulcrum pin 38 to unseat a quick release valve 39, while in the normal elevated plane of movement of said handle said valve is adapted to be seated by a spring 40. The quick release valve 39 is contained in a chamber 41 which is open through a passage 42 and a check valve chamber 43 to the application pipe 20, said valve controlling communication between said pipe and chambers and a chamber 44 which is open to atmosphere through a vent port 45.

The self-lapping fluid pressure supply and release mechanism 27 comprises a plunger 46 slidably mounted in a bore in the casing with one end engaging the peripheral surface of cam 25. The plunger 46 is provided with a pin 46a and pivotally mounted on said pin intermediate its ends is an equalizing bar 47 one end of which is connected by a pin 48 to a supply valve 49 contained in chamber 13, said valve being provided to control flow of fluid under pressure from said chamber to a chamber 50 and thence past a check valve 51 contained in chamber 43 to the application pipe 20, the chamber 50 being open directly to the portion 21 of the distributing valve release pipe. A spring 52 acts on check valve 51 to urge it to seat. The other end of bar 47 engages the end of a stem 53 of a release valve 54 arranged to cooperate with a seat on a movable abutment 55, preferably in the form of a piston, for controlling communication between chamber 50 at one side of said abutment and a chamber 56 at the opposite side. A spring 57 carried by the abutment 55 acts on the release valve 54 to urge it away from its seat. The abutment 55, it will be noted, is subject on one face to pressure of fluid in chamber 50 and on its opposite face to pressure of a regulating spring 59. Chamber 56 is open via passage 60 to the automatic brake valve device 1, to a screw-threaded port 61 open to atmosphere and to a chamber 62 containing the cut-off valve 28, a spring 63 in chamber 62 acting on the cut-off valve 28 urging it to its seat.

The cam 26 is so designed as to permit closing of valve 28 only in running position of handle 35. The cam 25 is so designed that in running position the supply valve 49 will be seated by a spring 64, the abutment 55 will be positioned, as shown in the drawing, by full extension of regulating spring 59 and the release valve 54 will be unseated by spring 57. Upon turning of handle 35 out of running position the cam 25 will displace plunger 46 toward the right hand a distance proportional to the extent of movement of said handle from running position.

Also associated with the automatic brake valve device 1 is a double heading cock 65 comprising a rotatable key or plug 66 and a handle 67 for turning said plug to either of two positions, namely lead and trail positions designated by legends in Fig. 2 of the drawing. In the lead position in which the handle 67 and valve 66 will be carried at the lead end of a locomotive when operating separately or at the lead end of the front locomotive in case of double or multiple heading, a cavity 68 in said valve will open brake pipe 14 to a passage 69 leading to the automatic brake valve device 1 to provide for control by said brake valve device of pressure of fluid in the brake pipe 14, while a port 70 in said valve opens a pipe 71 to atmosphere via an atmospheric passage 72. On all trailing units of a locomotive in double or multiple heading, the handle 67 and valve 66 will be in trail position closing communication between brake pipe 14 and passage 69 while a cavity 73 in said valve will open pipe 71 to the main reservoir pipe 15 to permit charging of pipe 71 with fluid under pressure from the main reservoir 6.

The distributing valve device 3 comprises the usual equalizing portion 75 and application portion 76. The equalizing portion 75 comprises an equalizing piston 77 at one side of which is a chamber 78 open to brake pipe 14 and at the opposite side a valve chamber 79 opens to a pressure chamber 80 and containing a main slide valve 81 and an auxiliary slide valve 82 operative by said piston. The application portion 76 comprises an application piston 83 arranged to control through the medium of a stem 84 a brake cylinder exhaust valve 85 and a brake cylinder supply valve 86, the latter valve controlling communication between supply chamber 12 and a valve chamber 87 containing the valve 85 and open by way of a passage 88 to the adjacent face of piston 83 and to a brake cylinder pipe 89 connected to the brake cylinder device 4.

At the opposite side of the application piston 83 is a chamber 90 connected to a passage 91 leading to the seat of the main equalizing slide valve 81 and to the application pipe 20. The distributing valve release pipe 22 is also connected to the seat of slide valve 81 in the usual manner.

To provide communication between the application piston chamber 90 and passage 91 on a diesel type of locomotive where the propulsion motor or motors are adapted to act as generators to provide dynamic braking, the open end of said chamber is, according to the invention, closed by a cover 92 upon which is removably mounted a dynamic brake interlock magnet valve device 93.

The magnet valve device 93 comprises two oppositely arranged poppet valves 94, 95 contained in a chamber 96 which is open by a passage 97 to the chamber 90. The valve 95 controls communication between passage 97 and a chamber 98 open to passage 91, while the valve 94 controls communication between passage 97 and a chamber 99 which is open to the distributing valve release pipe 22. The passages 97 and 91 are permanently open to each other through a passage containing a choke 100. The magnet valve device further comprises a magnet 101 adapted through coil terminals 102 to be energized when the locomotive dynamic brakes are effective and deenergized when ineffective. In double or multiple heading the motors in all locomotive units operate in synchronism to provide dynamic braking in which case the magnets 101 on all the locomotives will be either energized at the same time or deenergized at the same time. Upon energization of magnet 101 the valve 94 will be unseated while the valve 95 will be closed. Upon deenergization of magnet 101 a spring 103 in chamber 98 will open valve 95 and close valve 94.

On locomotives not equipped for dynamic braking, the cover 92 and magnet valve device 93 will not be employed but instead the usual cover will be used which provides an unrestricted opening between chamber 90 and passage 91.

According to the invention, we further add to the brake equipment, a bracket 104 upon which there are mounted an interlock valve device 105, a cut-out valve device 106 and, for a locomotive equipped for dynamic braking, the interlock valve device 23.

The valve devices 23 and 105 may be of identical construction, each comprising a valve 107 contained in a chamber 108. The valve 107 is provided on the end of a stem 109 slidably mounted in a bore in the casing, said stem having beneath said valve an annular groove 110. A bore 111 open at one end to chamber 108 extends axially through valve 107 and stem 109 and opens at its opposite end through a valve seat formed on said stem to a chamber 112 containing a valve 113 arranged to cooperate with said seat for closing communication between chamber 112 and said bore. The valve 113 is connected to one end of a stem 114 extending from chamber 112 through a bore in a partition wall 115 into a chamber 116 where its opposite end is provided with a follower head 117 engaging one side of a flexible diaphragm 118 at the opposite side of which is a control chamber 119. Chamber 116 at one side of diaphragm 118 is open to atmosphere through a breather port 120 and contains a spring 121 acting through follower 117 on diaphragm 118 for urging said follower, diaphragm 118 and valve 113 to the position in which they are shown in the drawing and in which valve 107 will be seated by a spring 122 contained in chamber 108. Upon downward deflection of diaphragm 118 the valve 113 will be seated and then actuate stem 109 to open valve 107.

In the interlock valve device 105 valve chamber 108 is open to a passage 123, the annular groove 110 in the valve stem 109 is open to the application pipe 20, valve chamber 112 is open to the brake cylinder pipe 89 and diaphragm chamber 119 is open to pipe 71. In the dynamic interlock valve device 23 valve chamber 108 is open to the portion 22 of the distributing valve release pipe, the annular groove 110 is open to passage 123, valve chamber 112 is open to the other portion 21 of the distributing valve release pipe and diaphragm chamber 119 is open to pipe 71. If the locomotive is not equipped for dynamic braking the interlock valve device 23 will be replaced by a plate (not shown) blanking the ends of passages 22, 123, 21 and pipe 71 where they open to the respective mounting face of bracket 104.

The cut-off valve device 106 comprises a valve 124 contained in a chamber 125 open to passage 123 and having a stem 126 extending into a chamber 127 which is open to the equalizing pipe 16. A spring 128 in chamber 125 acts on valve 124 for urging it seated. The end of the valve stem 126 is arranged to be engaged by a stem 129 extending from chamber 127 through a partition wall 130 into a chamber 131 where it terminates in a follower head 132 engaging one side of a flexible diaphragm 133 at the opposite side of which is a chamber 134 open to the main reservoir pipe 15. Chamber 131 is open to atmosphere through a vent port 135 and contains a spring 136 acting through the follower head 132 on diaphragm 133 for urging said head and diaphragm and the stem 129 to the position in which they are shown in the drawing to permit seating of valve 124 by spring 128.

OPERATION

Initial charging of the brake equipment

When fluid under pressure is supplied to the main reservoir 6 in the usual manner, fluid will flow therefrom to pipe 9 and from ahead of the check valve 10 through a pipe 137 via a choke 138 therein to the main reservoir pipe 15. In case of double or multiple heading of locomotive units this will occur on each locomotive equalizing the pressures of fluid in the main reservoirs on the several locomotives. On each locomotive fluid under pressure thus supplied to the main reservoir pipe 15 will flow to chamber 134 in the cut-off valve device 106 and deflect diaphragm 133 against spring 136 to open the valve 124 for thereby connecting the passage 123 to the equalizing pipe 16.

On each locomotive fluid under pressure from the main reservoir pipe 15 will also flow to the double heading cock 65, where on the lead or controlling locomotive it will be blocked against further flow with the valve 66 in lead position. In case of double or multiple heading the double heading cock 65 will be in trail position on the trailing locomotive or locomotives due to which fluid under pressure from the main reservoir pipe 15 will flow through cavity 73 in said valve to pipe 71, said pipe on the lead locomotive being vented via port 70 in the valve 66 and atmospheric port 72.

On the lead locomotive where pipe 71 is vented diaphragm chambers 119 in the two interlock valve devices 23 and 105 will therefore be vented while in case of double or multiple heading said chambers on the trailing locomotive or locomotives will be charged with fluid under pressure.

With chamber 119 in the interlock valve device 105 on the lead locomotive vented the valve 113 will be open and the valve 107 closed so that the brake cylinder pipe 89 will be open past the valve 113, through the bore 111 in valve stem 109 and chamber 108 to passage 123 and thence to the equalizing pipe 16 past the open valve 124 in the cut-off valve device 106. With chamber 119 in the interlock valve device 23 vented the valve 113 therein will be open and valve 107 closed for establishing communication between the two portions 22, 21 of the distributing valve release pipe via chamber 108 in said device, bore 111 in stem 109 and chamber 112.

On the trailing locomotive or locomotives where pipe 71 is charged with fluid under pressure the diaphragm chamber 119 in the interlock valve devices 23 and 105 will be charged with fluid under pressure as a consequence of which the valves 113 therein will be closed and the valves 107 open. With the valve 113 closed and valve 107 open in the interlock valve device 105 the equalizing pipe 16 will be open to the application pipe 20 via the open valve 124 in the cut-off valve device 106, passage 123, chamber 108 in said device 105 and past the open valve 107 therein, while in the dynamic brake interlock device 23 the closing of valve 113 interrupts communication between the two portions 22, 21 of the distributing valve release pipe and opens the portion 22 from the distributing valve device 3 to passage 123.

Fluid under pressure supplied to pipe 9 from the main reservoir 6 will also flow through check valve 10 to reservoir 7 to charge same and from said reservoir will flow to pipe 11 and thence to the application valve chamber 12 in the distributing valve device 3, to the automatic brake valve device 1 and to the supply valve chamber 13 in the independent brake valve device 2.

On a single locomotive or on all in case of double or multiple heading the handle 35 of the independent brake valve device 2 will normally be in its running and elevated position permitting closure of the supply valve 49 and opening of the release valve 54 and also the independent release valve 28 and the quick release valve 39 will be closed. With the release valve 54 open on the lead locomotive the distributing valve release pipe 21, 22 will be vented to atmosphere past said valve, through passage 60 and the screw-threaded opening 61. On a trailing locomotive or locomotives the portion 21 of the distributing valve release pipe will also be vented but this is of no consequence since the portion 22 is disconnected from portion 21 and opened through the dynamic brake interlock valve device 23 to passage 123 and thence through the cut-off valve device 106 to the equalizing pipe 16 which on the lead locomotive is open through the cut-off valve device 106 and interlock valve device 105 to the brake cylinder pipe 89.

On a single locomotive or the lead locomotive in case of multiple heading, the handle 140 of the automatic brake valve device will normally be in running position for charging via the double heading cock 65 the brake pipe 14 with fluid under pressure in the usual manner. On a trailing locomotive or locomotives the automatic brake valve handle 140 will also be carried in running position but it will have no control over brake pipe pressure with the double heading cock 65 in trail position since communication is broken between the brake pipe and said brake valve device.

Fluid under pressure thus supplied to the brake pipe 14 by the automatic brake valve device 1 on a single locomotive or the lead locomotive in case of multiple heading will flow back to brake equipment on cars of a connected train to charge such brake equipment and effect a release of brakes on the cars in the well-known manner. On the locomotive, or on each locomotive in case of multiple heading, fluid under pressure supplied to the brake pipe will flow to the equalizing piston chamber 78 of the distributing valve device and move the piston 77 and slide valves 81, 82 to their release position in which a feed groove 141 is opened around said piston to permit fluid under pressure to flow from chamber 78 to chamber 79 and the pressure chamber 80 for charging the latter two chambers with fluid at the same pressure as in the brake pipe. With the main equalizing slide valve 81 in release position, a cavity 142 therein opens passage 91 and thereby the application piston chamber 90, and also an application chamber 143 to the portion 22 of the distributing valve release pipe. On the lead locomotive the portion 22 of the distributing valve release pipe is open to portion 21 and thence to atmosphere past the release valve 54 in the independent brake valve device, whereby the application piston 83 will assume its release position permtiting closure of the application valve 86 and the exhaust valve 85 assumes its release position for venting valve chamber 87 and thereby passage 88, the chamber at the right-hand face of piston 83, pipe 89 and the brake cylinder device 4 to atmosphere via an atmospheric port 147 for releasing brakes on the lead locomotive in the usual manner.

As the brake cylinder device 4 on the lead locomotive is thus vented, the equalizing pipe 16, which is open to said brake cylinder device 4 via the cut-off valve device 106 and interlock valve device 105, will likewise be vented. On a trailing locomotive or locomotives where the parts of the interlock valve devices 23 and 105 are in their lower positions opening the portion 22 of the distributing valve release pipe and the application cylinder pipe 20 to passage 123 and thence through the cut-off valve device 106 to the equalizing pipe 16, the application piston chamber 90 will be vented with the brake cylinder device 4 on the lead locomotive whereby the application portion 76 of the distributing valve device on the trailing locomotive or locomotives will assume release position for venting the respective brake cylinder device 4.

Let it also be assumed, until further notice, that the dynamic brakes on the locomotive, or on all in case of multiple heading, are ineffective and the magnet 101 therefore deenergized, due to which valve 94 will be closed and valve 95 open.

*Automatic application and release of brakes*

If the engineer on a single locomotive or on the lead locomotive in case of multiple heading now desires to effect an automatic application of brakes thereon and on the connected cars of a train, he will turn the automatic brake valve handle 140 to service position to effect a desired degree of service reduction in pressure in brake pipe 14 and then to lap position for holding the brake pipe pressure at the desired reduced degree. In response to this service reduction in brake pipe pressure on the locomotive or on each locomotive in case of multiple heading, the equalizing piston 77 of the distributing valve device 3 will move the slide valves 82, 81 to their usual service position in which a service port 144 in slide valve 81 will register with passage 91 and be opened past the slide valve 82 to valve chamber 79, and a cavity 145 in slide valve 82 will open passage 91 to a passage 146 leading to the application chamber 143. Fluid under pressure will then flow from the pressure chamber 80 to the application piston chamber 90 and application chamber 143 until the pressure in valve chamber 79 becomes reduced slightly below reduced brake pipe pressure in chamber 78 whereupon the equalizing piston 77 will move the slide valve 82 on the slide valve 81 to lap port 144 for limiting the amount of fluid under pressure obtained in the application 90 in accordance with the degree of reduction in brake pipe pressure.

If the brake valve handle 140 is turned to emergency position, sudden and complete venting of fluid under pressure from the brake pipe 14 will occur due to which the equalizing piston 77 will move to and remain in an emergency position in which the left-hand end of the main slide valve 81 will open passage 91 directly to valve chamber 79 and passage 146 from the application chamber 143 will be lapped by said slide valve whereupon pressure of fluid in the pressure chamber 80 will equalize into the application piston chamber 90.

Whether due to either a service or an emergency reduction in brake pipe pressure, the pressure of fluid obtained as just described in the application piston chamber 90 will shift piston 83 toward the right hand operating slide valve 85 to close the brake cylinder exhaust port 147 and opening the supply valve 86 whereupon fluid under pressure from the supply valve chamber 12 will flow to pipe 89 and brake cylinder device 4 for applying the locomotive brakes.

In order to release an automatic application of locomotive brakes, handle 140 of the brake valve device of the lead locomotive will be returned to running position for recharging the brake pipe 14. On each locomotive, in case of either single locomotive or multiple heading, the equalizing piston 77 will then return the slide valves 81, 82 to release position to connect the application piston chamber 90 to the portion 22 of the distributing valve release pipe. On the lead locomotive fluid under pressure then will be released from the application piston chamber 90 to the portion 21 of the distributing valve release pipe and thence to atmosphere past the open release valve 54 in the respective independent brake valve device whereupon the application portion 76 of the distributing valve device will release fluid under pressure from the brake cylinder device 4 through the exhaust port 147 thereby releasing the brakes. On the trailing locomotive or locomotives, in case of multiple heading, where the portion 22 of the distributing valve release pipe is open through the interlock valve device 23 and cut-off valve device 106 to the equalizing pipe 16 which is connected to the brake cylinder device on the lead locomotive, the pressure of fluid in the application piston chamber 90 will release with the brake cylinder pressure on the lead locomotive thereby causing operation of the application portion 76 of the distributing valve device on the trailing locomotive or locomotives to release fluid under pressure from the brake cylinder device 4 thereon for releasing the respective brakes.

On a locomotive not equipped for dynamic braking, the screw-threaded port 61 at the independent brake valve device 2 will be closed by a plug (not shown) whereby release of fluid under pressure from the distributing valve release pipe portion 21 will occur through passage 60 and the usual vent port 148 in the automatic brake valve device 1 in running position thereof. This is conventional practice with the well-known ET equipment. The automatic brake valve device 1 has a holding position, like in the ET, for supplying fluid under pressure to the brake pipe 14 for effecting release of the brakes on cars of a train and for also moving the equalizing portion 75 of a distributing valve device to its release position, but in said position communication is closed between passage 60 and the vent port 148 which will prevent release of fluid under pressure from the application piston chamber 90 of the distributing valve device whereby the brakes on the locomotive will be held applied. With the brakes on the lead locomotive, in multiple heading, thus held applied, the brakes in the trailing units will be held applied since their release is dependent upon venting the brake cylinder device 4 on the lead locomotive. When it is desired to release the locomotive brakes however, the automatic brake valve handle 140 will be turned to running position where a release will occur the same as above described.

With the plug (not shown) removed from the port 61, as necessary on dynamic braked locomotives, the purpose of holding position of the automatic brake valve handle 140 is lost, said position then serving only the same purpose as running position.

*Control of brakes by independent brake valve device 2*

With the automatic brake valve device 1 in running position causing the brake pipe 14 to be charged with fluid under pressure and with the equalizing portion 76 of the distributing valve device 3 in release position, if the engineer desires to apply the locomotive brakes without applying the brakes on a train, he will move handle 35 of the independent brake valve device 2 on the locomotive or the lead locomotive in case of multiple heading out of running position into its application and release zone. This will actuate cam 25 to displace plunger 46 and bar 47 toward the right hand, said bar initially turning on the supply valve stem 48 to seat the exhaust valve 54 and then turning on the exhaust valve stem 53 to unseat the supply valve 49. Upon unseating of the supply valve 49 fluid under pressure from chamber 13 will flow to chamber 50 and thence past the check valve 51 to the application pipe 20 and from said pipe through passage 91 to the application piston chamber 90 of the respective distributing valve device 3 and at the same time fluid under pressure from chamber 50 will also flow to said application piston chamber through the portions 21, 22 of the distributing valve device release pipe, the cavity 142 in the equalizing slide valve 81 of the distributing valve device and passage 91 with the equalizing portion 75 of the distributing valve device in release position. The fluid pressure thus provided in chamber 90 will actuate the application portion 76 of the distributing valve device to apply the brakes on the locomotive.

As fluid under pressure is supplied to chamber 50 in the independent brake valve device such pressure acting on piston 55 will gradually move said piston against spring 59. Assuming that movement of the brake valve handle 35 has been stopped in some chosen position, the movement of piston 55 by pressure of fluid in chamber 50 will permit the supply valve 49 to move toward and finally into contact with its seat at a pressure in chamber 50, it will be noted, corresponding to the position of handle 35 out of its running position, whereby the pressure obtained in the brake cylinder device by operation of the application portion 76 of the distributing valve device will correspondingly be limited, in the usual manner.

As fluid under pressure is thus supplied to the brake cylinder device 4 on the lead locomotive in case of multiple heading, fluid under pressure will flow from said device through the interlock valve device 105 and cut-off valve device 106 to the equalizing pipe 16 on the lead locomotive and back through said pipe to the trailing locomotive or locomotives where such fluid will flow from said pipe through the cut-off valve device 106 to chamber 108 in the interlock valve device 105 thence past the unseated valve 107 therein to the application pipe 20 and application piston chamber 90, whereby on the trailing locomotive or locomotives the application portion 76 of the distributing valve device 3 will be operated by pressure from the brake cylinder device 4 on the lead locomotive to provide a corresponding brake applying pressure in the brake cylinder device on the trailing locomotive or locomotives.

In order to release an application of brakes effected by the independent brake valve device 2 as just described, the independent brake valve handle 35 may be returned to running position in which the release valve 54 will be opened by spring 57 whereupon on the lead locomotive the distributing valve release pipe 21, 22 and thereby the application piston chamber 90 will be vented via the exhaust port 61 to cause a release of the brakes on the lead locomotive. If a faster rate of release is desired the independent brake valve handle upon movement to running position may also be depressed to open the quick release valve 39 for venting the application piston chamber 90 via the application pipe 20 directly to chamber 44 and thereby atmosphere. In either case, upon release of fluid under pressure from the brake cylinder device 4 on the lead locomotive, in case of multiple heading, the pressure in the application piston chamber 90 of the distributing valve device on the trailing locomotive or locomotives will be dissipated through the equalizing pipe 16 along with brake cylinder pressure on the lead locomotive so that the application portion 76 of the distributing valve device on the trailing locomotive or locomotives will operate to release the brakes thereon.

Now assuming that by operation of the automatic brake valve first to its service position and then its lap position an automatic application of brakes is in effect on the locomotive and connected cars of a train and that it is desired to release such application on the locomotive without releasing the brakes on said cars. Under such a condition the equalizing portion 75 of the distributing valve device will be in service lap position in which the distributing valve release pipe portion 22 is disconnected from the application pipe passage 91. To accomplish such release the independent brake valve handle 35 will therefore be depressed in running position to open the quick release check valve 39 whereupon fluid under pressure will be released from the application piston chamber 90 via the application pipe 20 the same as above described to cause release of fluid under pressure from the brake cylinder device 4 and thereby a release of brakes. In case of multiple heading, the pressure in the application piston chamber 90 on the trailing locomotive or locomotives will release with release of fluid under pressure from the brake cylinder device 4 on the lead locomotive to thereby cause a release of brakes on the trailing locomotive or locomotives as above described.

With the pressure in brake pipe 14 still reduced and an automatic application of brakes in effect on connected cars of a train, the engineer may reapply the locomotive brakes by moving the independent brake valve handle 35 into the application zone for supplying via the application pipe 20 fluid under pressure to the application piston chamber 90 of the distributing valve device 3 on the lead locomotive to cause operation of the application portion 76 thereof to apply the locomotive brakes. In case of multiple heading, the fluid under pressure thus provided in the brake cylinder device 4 on the lead locomotive will equalize through the equalizing pipe 16 into the application piston chamber 90 of the distributing valve device on a trailing locomotive or locomotives and cause operation of the application portion 76 thereon to apply the brakes to the same degree as applied on the lead locomotive. A subsequent release of locomotive brakes may be effected by recharging the brake pipe 14 or by returning the independent brake valve device 2 to running position, as will be clear from description above.

When the automatic brake valve device 1 is in service or lap position for effecting an automatic application of brakes, the passage 60 is disconnected from the vent 148 and with the plug (not shown) in place closing the atmospheric vent from passage 60, it will be noted that if pressure should accumulate in said passage and chamber back of piston 55 due to leakage past said piston from chamber 50, such pressure would act in conjunction with that of spring 59 on piston 55 and influence pressure obtained in chamber 50 and thereby the degree of an independent application of brakes, but such is avoided by check valve 28 which is opened by cam 26 in all brake applying positions of the independent brake valve handle 35. With handle 35 in its running position, the check valve 28 is closed however to permit the control of release of a brake application on a locomotive or the lead locomotive in case of multiple heading in holding position of the automatic brake valve device, as above described.

Dynamic braking of locomotive

If the locomotive, or locomotives in case of multiple heading, is equipped for dynamic braking, the magnet 101 will be deenergized when the dynamic brakes are ineffective. Under this condition the brakes on the locomotive may be controlled in the same manner as above described.

When the dynamic brakes on the locomotive are rendered effective, however, the magnet 101 is energized; in the case of multiple heading, said magnet on each locomotive unit is energized. The energization of magnet 101 opens valve 94 and closes valve 95 thereby opening the application piston chamber 90 directly to the distributing valve release pipe portion 22.

If an automatic application of fluid pressure brakes is in effect at the time the dynamic brake is cut into action and the equalizing portion 75 of the distributing valve device 3 is therefore in lap position disconnecting the application passage 91 from the portion 22 of the distributing valve release pipe, the by-pass between the application chamber 90 and said pipe opened by the magnet valve 94 will permit pressure of fluid in the application piston chamber 90 to be promptly released to atmosphere through the distributing valve release pipe 22, 21 via the dynamic interlock valve device 23 and past the open release valve 54 in the independent brake valve device 2, whereupon the application portion 76 of the distributing valve device will release the fluid under pressure from the brake cylinder device 4. In case of multiple heading such release of fluid under pressure from the brake cylinder device 4 on the lead locomotive will result in release of fluid under pressure from the equalizing pipe 16 and thereby the application piston chamber 90 and brake cylinder device 4 on the trailing locomotive or locomotives, whereby the brakes on all units of the locomotive will promptly release when the dynamic brakes become effective.

When the dynamic brakes are cut into operation at the time an automatic application of brakes is in effect, the seating of the magnet valve 95 closes the communication around choke 100 the flow capacity of which choke is so small as to permit prompt reduction in pressure in the application piston chamber 90, as above described. After such prompt reduction, whatever pressure is present in passage 91 and the application pipe 20 is then gradually dissipated to atmosphere on a single locomotive or the lead locomotive in multiple heading through choke 100 and the distributing valve release pipe 22, 21, the purpose of this being to prevent bottling-up of fluid under pressure in passage 91 and the application pipe 20, while the dynamic brakes are effective, which upon the dynamic brakes being cut-out of operation could become effective in the application piston chamber 90 and cause an undesired application of brakes. On a trailing locomotive or locomotives in case of multiple heading, the fluid under pressure dissipated through choke 100 to the portion 22 of the distributing valve release pipe will flow through the interlock device 23 and cut-off valve device 106 to the equalizing pipe 16 and thence through the interlock device 105 on the lead locomotive to the brake cylinder pipe 89 thereon from which it will be vented via the application portion 76 of the respective distributing valve device 3 in order to prevent reapplication of the brakes on the trailing locomotive or locomotives when the dynamic brakes are cut-out of operation.

If while the dynamic brakes are effective the automatic brake valve device 1 is operated to reduce the pressure of fluid in brake pipe 14 to cause or to increase the degree of an application of brakes on cars of a connected train, the fluid under pressure supplied by consequent operation of the equalizing portion 75 of the distributing valve device to passage 91 and the application pipe will be gradually dissipated through choke 100 in the same manner and for the same reason as above described, whether on a single locomotive unit or in case of multiple heading.

It is to be noted that the release of an automatic application of fluid pressure brakes upon the dynamic brake being cut-into operation or the prevention of an automatic application while the dynamic brakes are acting is obtained by opening the application piston chamber 90 to atmosphere via the distributing valve release pipe 22, 21 and past the open valve 54 in the independent brake valve device on the locomotive or the lead locomotive in case of multiple heading. It will therefore be seen that if the engineer desires to apply the brakes on the lead locomotive he need only operate the independent brake valve handle 35 into its application zone to close the release valve 54 and open the supply valve 49 whereupon fluid under pressure will be supplied through the distributing valve release pipe 22, 21 to the application piston chamber 90 to cause such an application. If subsequently he desires to release such application, the independent brake valve handle 35 may be returned to running position to open valve 54 whereupon a release will occur. In case of multiple heading the brakes on the trailing locomotive or locomotives as controlled from the brake cylinder device 4 on the lead locomotive will apply and release as the brakes on the lead locomotive apply and release, as will be seen from previous description.

On a single locomotive or the lead locomotive in case of multiple heading, it will be noted that the dynamic brake interlock device 23 opens the two portions 21, 22 of the distributing valve release pipe to each other to permit release of an automatic application, or to prevent an automatic application, or to permit application and release of locomotive brakes by operation of the independent brake valve device 2, while on the trailing locomotive or locomotives in case of multiple heading, said interlock device 23 opens the portion 22 of the distributing valve release pipe to the equalizing pipe 16 whereby the brakes on the trailing locomotive or locomotives will operate according to the operation of the brakes on the lead unit. From the above description, it will also be noted that control of brakes on a single locomotive unit or on all locomotive units in case of multiple heading is independent of the dynamic brake interlock device 23. Hence on a locomotive or locomotives not equipped for dynamic braking, the dynamic brake interlock device 23 is not necessary and may be replaced with a blanking cover (not shown) for closing the adjacent ends of the various passages in the bracket 104. Under such a condition the application piston chamber cover 92 and magnet valve device 93 could also be replaced with the simple conventional cover merely having a passage for opening passage 91 to the application piston chamber 90.

Break-in-two

Now let it be assumed that the fluid pressure brakes on a locomotive, or on the locomotives in case of multiple heading, and connected cars of a train are released, and that the locomotive, or one or more locomotive units in case of multiple heading, breaks away from the remainder of the train.

Under such a condition the pressure in the brake pipe 14, and due to choke 138 the pressure in the main reservoir pipe 15 will suddenly reduce to atmospheric pressure and the equalizing pipe 16 will also be opened to atmosphere. In response to the reduction in pressure in the main reservoir pipe 15 fluid under pressure will be suddenly vented from chamber 134 in the cut-off valve device 106 on the locomotive unit or units broken away due to which spring 136 in said device will deflect diaphragm 133 to permit closing of valve 124 by spring 128. The sudden reduction in pressure in brake pipe 14 will cause the equalizing portion 76 of the distributing valve device 3 on the locomotive or locomotives broken away to assume emergency position for permitting fluid under pressure to flow from the pressure chamber 80 to passage 91 and thence to the application pipe 20 and to the application piston chamber 90, the pressure of such fluid in chamber 90 causing operation of the application portion 76 of the distributing valve device to supply fluid under pressure to the brake cylinder device 4 to apply the locomotive brakes. On a single locomotive, or the lead locomotive in case more than one breaks away, fluid supplied to the brake cylinder device 4 will flow through the interlock device 105 to valve chamber 125 in the cut-off valve device 106, but since valve 124 is now seated, it will prevent dissipation of such fluid to the equalizing pipe 16 which is now vented, while on a trailing locomotive or locomotives, the parts of the interlock valve device 105 being in their lower position with valve 113 seated will hold pressure in the brake cylinder device thereon and the valve 124 being seated will hold pressure in the application pipe 20 which is open past the open valve 107 in the interlock valve device 105 to passage 123 and thereby chamber 125 in the cut-off valve device.

Thus an application of brakes is positively ensured on a locomotive on one or more units thereof, in case of break-away from a train, to cause stopping thereof. When such a break-away occurs, the brakes on the cars of the train will be automatically applied in emergency to cause stopping thereof in the usual well-known manner, while if a locomotive unit remains attached to the train, the closing of valve 124 in the cut-off valve device 106 thereon with the parts of the selector valve device 106 in their lower position prevents release of fluid under pressure from the application pipe to ensure application of brakes thereon and stopping with the cars of a train.

SUMMARY

From the above description, it will now be seen that we have provided an improved locomotive equipment for providing independent control of brakes on all units of a locomotive in case of multiple heading from the independent brake valve device on the leading locomotive; which will automatically cause release of an automatic application of fluid under pressure or prevent an automatic application whenever dynamic brakes are effective but which will not interfere with the control of brakes by the independent brake valve device; and which will ensure application of fluid pressure brakes on a locomotive unit or units in case of break-away from a train.

Having now described our invention, what we claim as new and desire to secure by Letters Patent, is:

1. In a locomotive brake equipment, in combination, a brake pipe, a distributing valve release pipe, a distributing valve device comprising an application portion operative in response to pressure of fluid in an application chamber to effect an application of brakes and in response to venting of fluid under pressure from said chamber to effect a release of brakes, and an equalizing portion operative in response to a reduction in pressure in said brake pipe to supply fluid under pressure to said chamber and in response to an increase in pressure in said brake pipe to open said chamber to said distributing valve release pipe which communication is closed by said equalizing portion upon operation thereof in response to reduction in brake pipe pressure, an engineer's independent brake valve device for selectively supplying fluid under pressure to said distributing valve release pipe or for opening said release pipe to atmosphere for releasing fluid under pressure therefrom, and a dynamic brake controlled magnet device for selectively opening said chamber either to said equalizing portion while closing communication between said chamber and said pipe or for opening said chamber to said distributing valve release pipe while closing communication between said chamber and said equalizing portion.

2. In a locomotive brake equipment, in combination, a brake pipe, a distributing valve release pipe, a distributing valve device comprising an application portion operative in response to pressure of fluid in an application chamber to effect any application of brakes and in response to venting of fluid under pressure from said chamber to effect a release of brakes, and an equalizing portion operative in response to a reduction in pressure in said brake pipe to supply fluid under pressure to said chamber and in response to an increase in pressure in said brake pipe to open said chamber to said distributing valve release pipe which communication is closed by said equalizing portion upon operation thereof in response to reduction in brake pipe pressure, an engineer's independent brake valve device for selectively supplying fluid under pressure to said distributing valve release pipe or for opening said release pipe to atmosphere for releasing fluid under pressure therefrom, and a dynamic brake controlled magnet device controlling one communication between said chamber and said equalizing portion and application pipe and a second communication between said chamber and said distributing valve release pipe and operative to open either one while closing the other, and a constantly open restricted communication connecting said chamber to said equalizing portion and application pipe in by-passing relation to said magnet device.

3. In a locomotive brake equipment, in combination, a brake pipe, a distributing valve release pipe, an application pipe, a distributing valve device comprising an application portion operable in response to pressure of fluid in a chamber to effect an application of brakes and in response to release of fluid under pressure from said chamber a release of brakes, and an equalizing portion operative upon a reduction in pressure of fluid in said brake pipe to supply fluid under pressure to said chamber and application pipe while closing communication between said chamber and distributing valve release pipe and operative upon an increase in brake pipe pressure to cut-off supply of fluid under pressure to said chamber and application pipe and open said chamber and application pipe to said distributing valve release pipe, an engineer's independent brake valve device for selectively venting either said application pipe or said distributing valve release pipe and for supplying fluid under pressure to both of said pipes, a check valve in the fluid pressure supply connection from said brake valve device to said application pipe, and a dynamic brake controlled magnet device operative to selectively open said chamber either to said equalizing portion and application pipe while closing communication between said chamber and said distributing valve release pipe or for opening said chamber to said distributing valve release pipe while closing communication between said chamber and said equalizing portion and application pipe.

4. In a locomotive brake equipment in combination, an application pipe, a distributing valve release pipe, a distributing valve device comprising a casing, an application piston in said casing operative in response to pressure of fluid in a chamber at one side of said piston to effect an application of brakes and in response to release of such fluid pressure to effect a release of brakes, a removable cover secured to said casing and cooperative with said piston to form said chamber and comprising a restricted passageway opening said chamber to said application pipe, and a communication of greater flow capacity than and by-passing said restricted passageway, a dynamic brake controlled magnet device operative to either open said communication while closing communication between said chamber and distributing valve release pipe or to close the last named communication while opening the first named communication, a brake pipe, said distributing valve device also comprising an equalizing portion operative upon a reduction in pressure of fluid in said brake pipe to supply fluid under pressure to said application pipe while closing communication between said application and distributing valve release pipes and operative upon an increase in brake pipe pressure to cut-off supply of fluid under pressure to said application pipe while opening said application pipe to said distributing valve release pipe, an engineer's automatic brake valve device for effecting a reduction in brake pipe pressure and also for increasing pressure of fluid in said brake pipe and at the same time venting another passageway, an engineer's independent brake valve device for supplying fluid under pressure to both said application and distributing valve release pipes and for also opening said distributing valve release pipe to the last named passageway and closable means separate from said automatic brake valve device adapted to open the last named passageway to atmosphere.

5. In a locomotive brake equipment, in combination, brake means operable by fluid under pressure to apply brakes and upon release of fluid under pressure to release brakes, application means operable by fluid under pressure in a chamber to supply fluid under pressure to said brake means and upon release of fluid under pressure from said chamber to release fluid under pressure from said brake means, an equalizing pipe adapted to extend from end to end of the locomotive for connection with a corresponding pipe on another locomotive in double heading of locomotives, valve means for selectively opening said equalizing pipe to said brake means to permit pressure of fluid in said pipe to vary with that in said brake means or to close communication between said pipe and brake means, an engineer's independent brake valve device, a distributing valve release pipe connected at one end to said brake valve device, a dynamic brake controlled means operative to selectively open or close communication between said chamber and the other end of said release pipe, other valve means controlling communication through said release pipe between said dynamic brake controlled means and said brake valve device selectively operative to open such communication or to close such communication and open to said equalizing pipe the part of said release pipe connected to said dynamic brake controlled means, and manually operative means for controlling both of said valve means, said brake valve device being operative to either open to atmosphere the end of said release pipe connected thereto or to supply fluid under pressure to the connected end of said release pipe.

6. In a locomotive brake equipment, in combination, brake means operable by fluid under pressure to apply brakes and upon release of fluid under pressure to release brakes, an application pipe, a brake pipe, a distributing valve release pipe, a distributing valve device comprising an application portion operable upon supply of fluid under pressure to a chamber to supply fluid under pressure to said brake means and upon release of fluid under pressure from said chamber to release fluid under pressure from said brake means, and an equalizing portion operative in response to a reduction in pressure in said brake pipe to supply fluid under pressure to said application pipe and to said chamber and in response to increase in pressure in said brake pipe to open said chamber and application pipe to said distributing valve release pipe, an engineer's independent brake valve device for supplying and releasing fluid under pressure to and from said distributing valve release pipe and said application pipe, an equalizing pipe adapted to extend from end to end of the locomotive for connection with a corresponding pipe on a coupled locomotive when double heading, valve means for selectively opening said equalizing pipe either to said application pipe or to said brake means to receive fluid under pressure from said brake means, other valve means controlling communication through said distributing valve release pipe operative to either open such communication or close same and open the portion of said release pipe connected to said distributing valve device to said equalizing pipe, manually operative means for controlling both of said valve means, and a dynamic brake controlled magnet device for selectively opening or closing communication between said chamber and the portion of said release pipe connected to said distributing valve device.

7. In a locomotive brake equipment, in combination, brake means operable by fluid under pressure to apply brakes and upon release of fluid under pressure to release brakes, an application pipe, a brake pipe, a distributing valve release pipe, a distributing valve device comprising an application portion operable upon supply of fluid under pressure to a chamber to supply fluid under pressure to said brake means and upon release of fluid under pressure from said chamber to release fluid under pressure from said brake means, and an equalizing portion operative in response to a reduction in pressure in said brake pipe to supply fluid under pressure to said application pipe and to said chamber and in response to increase in pressure in said brake pipe to open said chamber and application pipe to said distributing valve release pipe, an engineer's independent brake valve device for supplying and releasing fluid under pressure to and from said distributing valve release pipe and said application pipe, an equalizing pipe adapted to extend from end to end of the locomotive for connection with a corresponding pipe on a coupled locomotive when double heading, a control pipe, valve means operative in response to pressure of fluid in said control pipe for opening said equalizing pipe to said application pipe and operative upon venting of said control pipe to open said equalizing pipe to said brake means to become pressurized according to pressure in said brake means, other valve means operative in response to pressure of fluid in said control pipe to close communication through said release pipe and to open the portion thereof connected to said distributing valve device to said equalizing pipe and operative upon venting of said control pipe to reestablish communication through said release pipe and disconnect said portion from said equalizing pipe, a manually operative valve having a lead position for venting said control pipe and a trail position for supplying fluid under pressure to said control pipe, and a dynamic brake controlled magnet device or selectively opening or closing communication between said chamber and the portion of said release pipe connected to said distributing valve device.

References Cited in the file of this patent

UNITED STATES PATENTS

| | | |
|---|---|---|
| 1,394,074 | Farmer | Oct. 18, 1921 |
| 1,621,403 | Hamilton | Mar. 15, 1927 |
| 2,159,788 | Farmer | May 23, 1939 |
| 2,464,968 | Erson | Mar. 22, 1949 |